Figure 1:
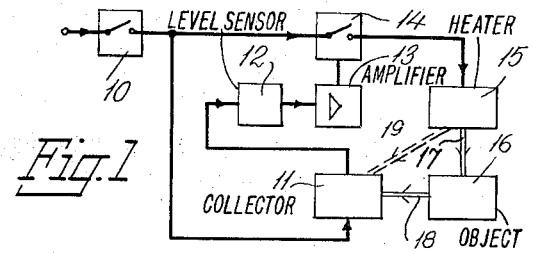

United States Patent [19]
Meuller

[11] 3,781,566
[45] Dec. 25, 1973

[54] DETECTING THE PRESENCE OF A MEDIUM IN THE PATH OF A SOUND OR LIGHT WAVE

[75] Inventor: Karl Helge Meuller, Stockholm, Sweden

[73] Assignee: Helge Meuller AB, Stockholm, Sweden

[22] Filed: July 13, 1971

[21] Appl. No.: 162,251

[30] Foreign Application Priority Data
July 16, 1970 Sweden.............................. 9868/70

[52] U.S. Cl................... 307/116, 104/279, 340/234
[51] Int. Cl. ........................................... H01h 35/18
[58] Field of Search.................... 104/279; 250/222; 340/234; 73/170, 171; 307/116

[56] References Cited
UNITED STATES PATENTS

| | | | |
|---|---|---|---|
| 2,938,423 | 5/1960 | Rich............................ | 73/170 R X |
| 2,476,217 | 7/1949 | Pond.......................... | 250/222 R X |
| 2,986,923 | 6/1961 | Vannegut..................... | 73/170 R X |
| 2,849,701 | 8/1958 | Clark............................ | 340/234 X |
| 3,194,960 | 7/1965 | Tuttle........................... | 104/279 X |

Primary Examiner—Gerald M. Forlenza
Assistant Examiner—George H. Libman
Attorney—Fleit et al.

[57] ABSTRACT

A method and system for detecting the presence on an object of media harmful to the efficient operation of the object. The system includes a measuring device having arranged therein a space for receiving the media to be detected, and wave transmitting means arranged at one end of the space and detector means responsive to waves transmitted by the wave transmitting means arranged at the opposite end of the space. The detector means is adapted to transmit a signal to actuator means co-operating with the object served by the system, to remove the harmful media from the object, said signal being dependent on the degree of damping to which the wave from the transmitter means is subjected by the media located in the media receiving space.

7 Claims, 13 Drawing Figures

PATENTED DEC 25 1973 3,781,566

INVENTOR
Karl Helge Meuller

BY Fleit, Gipple & Jacobson
ATTORNEYS

DETECTING THE PRESENCE OF A MEDIUM IN THE PATH OF A SOUND OR LIGHT WAVE

The present invention relates to a method and a system for detecting the presence of a medium, such as snow, for example, in the path of a wave.

It is often desirable to detect the possible presence of snow and ice on different types of mechanical appliances. Furthermore, it is particularly desirable in railway systems to detect quickly the presence of snow and ice on, for example, point switches and to remove the snow and ice therefrom rapidly. The automatic indication of snow and ice or other media, such as smoke or fog, is not limited, however, to such systems, but is also useful in other connections.

Point switches and other devices used in railway systems which are sensitive to snow and ice are often provided with heating devices which, for example, under the influence of an adjustable thermostat remove the ice and snow by melting the same. The thermostat is often set to a temperature immediately above 0°C and is arranged to come into operation and remain operational at lower temperatures than that for which it is set. This method of procedure has the serious disadvantage whereby the heating equipment is caused to operate at temperatures lower than that for which it is set irrespective of whether snow and ice are present on the heated object or not, which naturally constitutes an uneconomical use of the available heating energy.

For the purpose of overcoming this disadvantage, it has previously been proposed to combine the thermostat with a humidity sensing device, the combination of low temperature and high moisture content being used as an indication of the presence of snow. With such an arrangement, however, there is a risk that cold dry snow falling at low temperatures avoids detection and blocks the snow-sensitive object such as a point switch or the like. A known device of this type is often mounted for correct operation some slight distance above the ground, which also causes surrounding snow to pass undetected. With another known device of this type, the humidity sensing means is in the form of two metal plates arranged relatively close together and between which a voltage is applied. This arrangement, however, is sensitive to vibrations, since the distance between the metal plates must be maintained at a relatively high degree of accuracy, and it may be unsuitable to mount the same adjacent, for example, a railway line.

A common feature of the type of snow detector which utilizes a combined humidity detecting device and a thermostat is that the evaluation equipment and the like is relatively complicated with subsequent increased costs and poor operational economy.

The aforegoing and related disadvantages are reduced by means of the present invention, which is based on a completely different principle, namely the principle whereby a wave, either an acoustic wave, a light wave or an electromagnetic wave, is dampened during its passage through snow and/or ice. The method of the present invention is therefore mainly characterized by the fact that a signal transmitted from the detector and dependent on the degree of damping to which the wave is subjected by the presence of the material to be detected in the measuring distance is used to indicate the presence of said medium.

The invention is also concerned with a system for putting the method of the invention into effect, said system being mainly characterized in that a chute-like measuring device having arranged therein a measuring distance which is shielded from possible disturbing waves originating from the surroundings, and at one end of which distance is arranged a wave transmitter and at the other a detector means which is responsive to said wave, and by means for utilizing a signal from the detector, which signal is dependent on the degree of damping to which the wave is subjected by the media present in said measuring distance, to indicate the presence of said media.

The wave may be an acoustic wave or electromagnetic radiation of relatively long wave length, although in a preferred embodiment of the invention light at or in the vicinity of the visible light portion of the spectrum is utilized.

Figure 2:
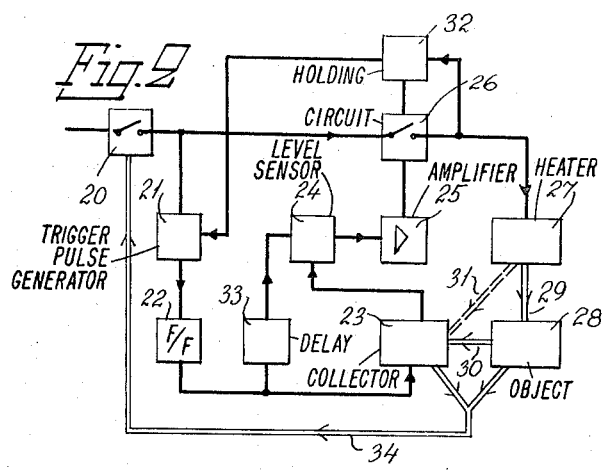

Further features of the invention will be evident from the following description, which is made with reference to the accompanying drawing, in which FIG. 1 is a block diagram of a system according to the invention for detecting snow and/or ice and used together with a heating device, FIG. 2 is a block diagram of another system according to the invention for detecting snow and/or ice and used together with a burner and particularly designed with view to good operational economy, and FIGS. 3A,3B,3C,3D,4A,4B,4C, 5,6,7, and 8 illustrate different embodiments of snow and/or ice collecting means provided with sensing devices.

FIG. 1 illustrates graphically a system according to the invention for detecting and removing snow and/or ice from an object. The embodiment illustrated in FIG. 1 is of relatively simple construction and is intended for use in places where the running economy of the system is relatively unimportant.

With the embodiment of FIG. 1, a main switch 10, which is connected to a power source not shown, can be actuated manually or controlled by a thermostat. When the switch is thermostat controlled, the thermostat is preferably adjusted to close the switch 10 when the surrounding temperature is immediately above 0°C and to hold the switch closed at temperatures therebelow. The main switch 10 is connected to a snow and/or ice collecting means 11. Located in the collecting means 11 is a sensing device which is connected to a level sensing means 12 which in turn is connected to a signal amplifier 13. The signal from the amplifier 13 actuates a switch 14, which may be a conventional relay whose attraction coil is connected to the amplifier 13, or a transistor switch controlled by the signal from the amplifier 13. The switch 14 is connected to a heater 15 which, while controlled by the switch 14, heats an object 16 and optionally also the collecting means 11 provided with the sensing device. The heat passing from the heater to the collecting means may either be conducted via the object 16, which is illustrated by means of the double-arrows 17 and 18, or be caused to pass directly from the heater 15, to the collecting means as illustrated by means of the dash line double-arrows 19.

In brief the system illustrated in FIG. 1 operates as follows. When the main switch 10 is closed, either manually or by means of the pre-set thermostat, the snow detecting system begins to operate. Electrical energy is supplied to a wave generator in the collecting means 11. The wave generator may suitably comprise a conventional lamp, but may also be in the form of an acoustic pendulum or a radiator for relatively low frequency electromagnetic radiation. The lamp is arranged so that it directs a beam of light towards the sensing device located in the collecting means.

As will be described hereinafter, the lamp and the sensing device are also arranged in a manner whereby the snow or ice fed to the collecting means 11 is located between the lamp and the sensing device. The sensing device is adapted to transmit a signal responsive to the intensity of the light falling thereon, said signal being passed to the level sensing means 12. The level sensing means 12 is of conventional construction and transmits on its output a signal of a certain level when the input signal to the level sensing means 12 exceeds a threshold level, and transmits a zero signal when the input signal is below the threshold level.

When snow and ice is fed to or collected in the collecting means, the intensity of the light falling on the sensing device decreases with an increasing quantity of snow, and when the quantity of snow reaches a predetermined level or density the signal from the sensing device will be such that the level sensing device 12 and the amplifier 13 will close the switch 14, which starts the heater 15. The heater 15 then begins to operate and delivers heat to the object 16 and, either directly or indirectly, to the collecting means 11. In this way, snow is removed from both the object 16 and the collecting means 11.

The heater 15 may be arranged so that after a predetermined period of time it is automatically cut off and automatically restarted and a new heating period commenced if the quantity of snow present in the collecting means 11 or the density of said snow is still in excess of permitted limits, by reason of the fact that the switch 14 is still energized. When the heater 15 is cut off and the quantity of snow or the density of the snow in the collecting means is less than the pre-set level corresponding to a condition of a snow-free and an ice-free object or a practically snow and ice-free object, the heater is disengaged by the de-energized switch 14.

When the main switch 10 is controlled by a thermostat, the thermostat may be arranged to sense the temperature, e.g., in the proximity of the object 16 or in the collecting means 11. In this instance, it is not necessary to time-control the heater 15, since the main switch 10 automatically shuts off the system when the temperature at the object 16 or the collecting means 11 is such that all, or practically all the snow has been melted.

Owing to its poor operational economy, the system illustrated in FIG. 1 is less suitable for use at remotely situated sites, for example along railway lines, where it is necessary to run the system from batteries. (In the case of electric railway systems, it is often relatively expensive to transform the voltage on the railway network to usable operation voltages for the snow detector, although of course this latter expedient is also a conceivable solution). In the case of remotely situated sites, such as those aforementioned, gas or liquid fuel burners are often used as heating devices, the burner normally being provided with an electric ignition circuit. In recent times such ignition circuits have been made very effective, so that their average current consumption has been very low. Consequently, it is necessary, while retaining the operation time of the system, to construct the detector with associated equipment in a manner whereby it uses current very sparingly. The embodiment of the snow and ice detector according to the invention illustrated in FIG. 2 satisfies the aforementioned requirement on the economic operation of the system.

A main switch 20, which in the illustrated embodiment is controlled by a thermostat, is connected to a source of energy (not shown) such as a battery or the like. The thermostat in the main switch 20 is suitably set to close the switch at a temperature immediately above 0°C and to hold the switch 20 closed at temperatures below the set temperature. The main switch 20 is connected to a trigger pulse generator 21 which in turn is connected to a monostable flip-flop 22. The flip-flop 22 is connected to a collecting means 23 which contains a sensing device and preferably also a wave generator, e.g. a lamp. Similarly to the embodiment of FIG. 1, the sensing device in the collecting means 23 is connected to a level sensing device 24 and an amplifier 25 which actuates a switch 26. The mode of operation of the units 23, 24, 25 and 26 is the same as the mode of operation of the units 11, 12, 13 and 14 in FIG. 1. When the switch 26 is closed, a heater 27 is connected and heats an object 28, illustrated with the double arrows 29, and the collecting means 23, either indirectly via the object as illustrated by the double arrows 30 or directly, as illustrated by the double dash-line arrows 31.

The trigger pulse generator 21 and the monostable flip-flop 22 are arranged so that the lamp in the collecting means 23 is energized and illuminated for a short period of time, of the order of 1 second, and so that the lamp in the collecting means 23 is switched off during the intervals between said periods. The interspaces between subsequent ignition pulses are of the order of some tens of a second or more, depending on the surroundings and the desired mean current consumption. When the quantity of snow and ice in the collecting means 23 reaches a level such that the level sensing device 24 and the amplifier 25 close the switch 26, the heater 27 is started up, as mentioned above. At the same time, however, a holder circuit 32 is also connected, the function of the holder circuit 32 being to hold the switch 26 closed even after the ignition pulse from the monostable flip-flop 22 has terminated and to pass a blocking signal to the trigger pulse generator 21, the signal blocking further generation of trigger pulses to the monostable flip-flop 22. Thus, when the switch 26 is energized as a result of a sufficient quantity of snow and/or ice in the collecting means 23, the heater 27 is started and further operation of the trigger pulse generator 21, the monostable flip-flop 22, the lamp and the sensing device in the collecting means 23, thhe level sensing device 24 and the amplifier 25 is blocked. The units 21-25 are thus so selected and arranged that their current consumption when in a closed or blocked condition is negligible, or at least very low.

In the illustrated embodiment, the thermostat in the main switch 20 is located adjacent the object of the collecting means 23 in a manner whereby the elevated temperature of the heater 27 located adjacent the unit 28, 23 can be sensed by the thermostat, as illustrated in FIG. 2 by the double drawn arrows 34. Thus, when the temperature at the site of the thermostat is sufficiently high, i.e. exceeds by some degrees the set temperature of 0°C, the main switch 20 is broken and the holder circuit 32 falls and breaks the switch 26. When the temperature in vicinity of the thermostat in the main switch 20 then falls again beneath the set temperature, the system is ready for a new operation cycle, the trigger pulse generator transmitting at intervals of some tens of seconds trigger pulses to the monostable flip-flop 22 which, with each trigger pulse, ignites the lamp in the collecting means 23.

The output signal from the monostable flip-flop 22 also causes the level sensing device 24 and the amplifier 25 to come into operation, whereby these elements can be disconnected during the time when the lamp is not energized. The level sensing device 24, which is preferably an electronic device, is much more rapid in operation than the lamp in the collecting means 23, and to ensure that the level sensing device 24 does not come into operation before the lamp in the collecting means 23 has been ignited (which may course the level sensing device to detect a beam of low-density light falling on the same and thereby start the heater) a delay means 33 is connected between the monostable flip-flop 22 and the level sensing device 24.

In the illustrated embodiment, which is particularly intended for high operation economy, the main switch 20 is preferably thermostat controlled, as mentioned above, so that the detecting system is not connected and does not load the energy source when the temperature is too high for snow to fall or of such magnitude that the snow is unharmful. It is, however, not necessary to use the thermostat in the main switch 20 as a cut-off device for the heater 27 and for breaking the holder circuit 32. Conventional time devices may be used for this purpose, or a further thermostat may be arranged, these devices being suitably arranged to break the switch 26. Instead of the heater 27, mechanical snow removing means or a pressure air device may be used when the conditions or the object 28 in question render the use of such means suitable. In this instance, the collecting means 23 may be constructed so that the snow and/or ice, or other impurities of interest present therein, can be removed by means of an appropriate device.

FIGS. 3–8 illustrate examples of collecting means provided with sensing devices corresponding to the unit 11 in FIG. 1 and the unit 23 in FIG. 2. In FIGS. 3–8 corresponding parts have been indicated with corresponding reference numerals.

Figure 3A:
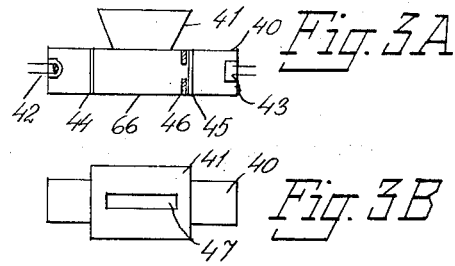
Figure 3B:
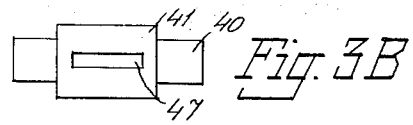
Figure 3C:
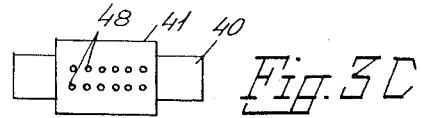
Figure 3D:
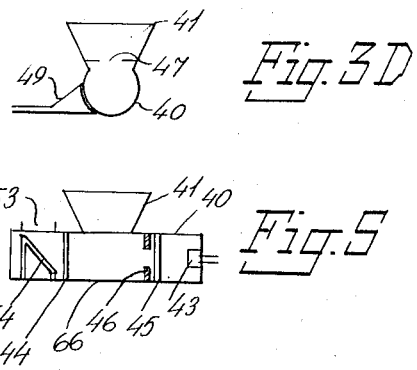

FIGS. 3A–3D illustrate diagrammatically an embodiment of the collecting means provided with a sensing device. FIG. 3A is a view of the embodiment in vertical section, FIG. 3B shows the same in a top plan view, FIG. 3C is a bottom plan view of the embodiment while FIG. 3D is a diagrammatic presentation of the embodiment in section seen from the side. The collecting means is in the form of a box, which may have a rectangular, square or, as with the illustrated embodiment, a circular section and is provided with an upwardly and outwardly tapering, funnel-like portion 41. At one end of the box 40 is arranged a lamp 42 and at the other a light responsive element 43, e.g. a photodiode. In the box 40, a central zone is defined by two partitions 44 and 45. If all the light transmitted from the light source is utilized in the system, the partitions may be made completely or partly of glass. Alternatively, the partitions may be made of a material which will only allow infrared radiation to pass through, e.g. a semiconducting material. A stationary shutter in the form of a ring 46 may be arranged in front of the partition 45.

When the system is in operation, snow is collected in the central zone of the box 40 through the funnel-like portion 41, at the lower end of which is arranged a slot 47 in the box 40. When the quantity of snow in the central zone of the box 40 located between the partitions 44 and 45 exceeds the level defined by the lamp 42 and the sensing device 43, the light transmitted from the lamp 42 towards the sensing device 43 is dampened, whereupon the output signal from the sensing device 43 is changed to a corresponding degree. When the magnitude of the change of the output signal from the sensing device 43 reaches a predetermined level, i.e. with the presence of a predetermined approximative quantity of snow in the central portion of the box 40, a heater or other snow removal means is brought into operation, as described above. Sufficient heat is supplied to the box 40 to melt the snow present therein and the water runs out through holes 48 disposed in the bottom of the box 40, see FIG. 3C. The box 40 can be heated directly from the heater, e.g. by directing the flames of the heater against the box, or by thermal conduction via the object and a connecting element 49 (FIG. 3D) made of good heat conducting material, such as copper or aluminum. The connecting element 49 can also be used for mounting the collecting means. When a heat conductor is used for heating the box 40, the box is also preferably made of a good heat conducting material, such as copper or aluminium.

When light is used as the wave source, the influence of ambient light must be reduced with the illustrated embodiment. The funnel-like collecting portion 41 having the slot 7 in the box 40 arranged at the bottom of the portion 41 substantially excludes the ambient light and by arranging the lamp 42 and the sensing device 43 in extensions of the box 40 located outside the slot 47, the ambient light is effectively shielded. Influence from the ambient light is further reduced by using infrared filters as the partitions 44, 45.

Figure 4A:
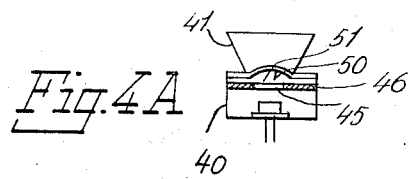
Figure 4B:
Figure 4C:
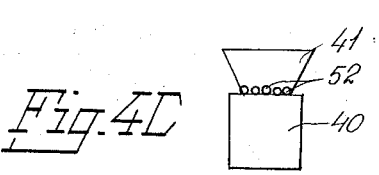

FIGS. 4A–4C illustrate an example of an embodiment of the collecting means provided with a sensing device, light from the surroundings, e.g. a lamp mounted above the railway track, being used as a light source. The collecting means in the embodiment of FIGS. 4A–4C is also in the form of a box 40 having an upwardly and outwardly tapering funnel-like portion 41. Arranged in the lower portion of the box is a sensing device 43, while above the device 43 is arranged a partition wall comprising a shutter 46 and a light filter 45. Optionally there is arranged above the partition wall 45, 46 a convex lens, which enables this type of collecting means to be used even when the intensity of the surrounding light is low.

Located at the lower portion of the funnel-like portion 41 is an upwardly arched, transparent surface 50, which terminates the lower portion of the funnel-like portion 41. Disposed around the lower most portion of the funnel-like portion 41 and the transparent surface 50 is a number of holes 52 (FIG. 4C) which are intended to serve as drainage holes for the melted snow.

The system operates as follows: Snow is collected in the funnel-like portion 41 above the arched surface 50 and when the quantity of snow in the funnel-like portion 41 is sufficiently great, i.e. the intensity of the light falling on the sensing device is brought to a sufficiently low level by the snow, a heater is started up. The heater then supplies heat to the funnel-like portion 41, either by direct heating or through a conductor, so that the ice and snow present in the funnel-like portion 41 melts and is drained through the holes 52.

Figure 5:
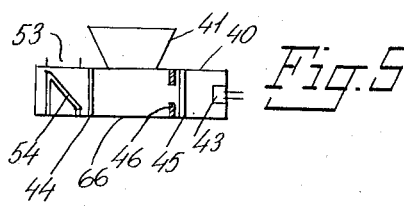

FIG. 5 illustrates another embodiment of the collecting means provided with a sensing device which is also intended to utilize the surrounding light as a light source. The box 40, the funnel-like portion 41, the sensing device 43, the partition walls 44 and 45, and the shutter 46 of the illustrated embodiment may be arranged in the same manner as the embodiment of FIG. 3A. With the embodiment at present being discussed, however, an opening 53 covered with a light-permeable material is located at the end of the box 40 remote from the sensing device 43, while arranged beneath the opening 53 and the box 40 is a mirror 54 so that light passing through the opening 53 is reflected towards the light-permeable or light-filtering partition walls 44 and 45 to the sensing device 43.

Figure 6:
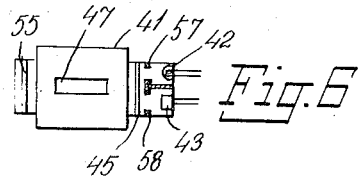

FIG. 6 illustrates an embodiment of the connecting means provided with a sensing device of the same type as the collecting means of FIG. 3A but with the lamp 42 and the sensing device 43 arranged at the same end of the box 40. This construction can be made more compact than the construction illustrated in FIG. 3A. The lamp 42 transmits light from the opening located between a T-shaped vertical partition element 56 and a shielding edge surface 57. The light then passes through a partition wall 45 of light-permeable or light-filtering material, and continues through the central portion of the box 40 in which snow and ice is collected and is reflected by a mirror 55 back through the centre portion of the box 40, the partition wall 45 and an opening between the T-shaped element 56 and a shielding edge surface 58 back to the sensing device 43.

Figure 7:
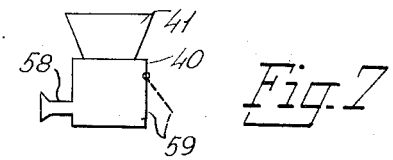

FIG. 7 illustrates an example of an embodiment of the collecting means for use with a compressed air means for removing snow and ice. In this embodiment, the funnel-like portion 41 is mounted on a box or the like 40 which is provided on one side with an inlet 48 for a stream of air and at its opposite side presents a flap 59 which is adapted to be opened by the stream of air so that the snow and ice present in the box 40 can be blown therefrom. The flap 59 can be spring-loaded so that upon completion of a cleaning operation it returns to its closed position, although the flap may also be arranged to close under the action of its own weight. To reduce the risk of the flap freezing fast at low temperatures, it may be provided with a rubber strip.

Figure 8:
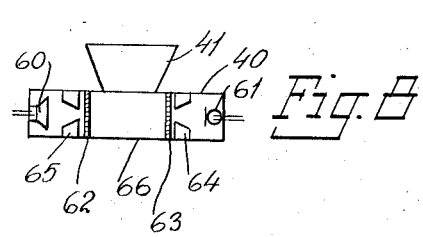

FIG. 8 illustrates a collecting means in which the wave used is in an acoustic wave. A sound transmitter 60, such as a piezoelectric crystal or the like is located at one end of the box. The sound transmitter 60 radiates sound through the central portion of the box 40, said portion being defined by two fine-mesh net structures 62 and 63 made of metal or a plastic material, towards a microphone 61 which may also be constructed of a piezo-crystal. Also located in the path of the sound wave are two directed and shielding elements 64 and 65. The mode of operation of this system is essentially the same as the mode of operation of the collecting means previously described.

As will be evident from FIGS. 3A, 5 and 8, the wave generator, i.e. the lamp 42, the mirror 54 and the sound source 60 respectively, and the sensing device 43 and 61 are preferably positioned at a certain distance above the bottom 66 of the box 40. The purpose of this is to provide space for the collection of rubbish, such as leaves, twigs, dust and the like on the bottom of the box without causing the heater or the compressed air means to be brought into operation. Since a snow detector constructed in accordance with the invention is often positioned at remote stations where it is not possible to carry out inspections and maintenance checks daily and where wind conditions and other environmental conditions may cause such rubbish to collect in the box such an arrangement as that just described is of great advantage.

The detecting means of the present invention may also be used in such situations when snow and ice does not constitute the most serious threat to the correct functioning of the appliance or device in question, but is equally suitable for use when this threat is in the form of sand, leaves or other solid waste material. When the threat to the correct functioning of the device or appliance is in the form of sand, leaves or other solid waste it can be suitable to arrange the collecting funnel 41 with the opening in a vertical plane or an intermediate position, depending on the circumstances, and to use a compressed air means or some other mechanical means for removing the waste material from the object and from the sensing device.

With humid conditions at low temperatures ice is likely to form and put the object in question, such as a point switch or the like, out of operation. Thus, ice will also form on the partition walls 44, 45, and the net structure 62, 63 in the sensing devices and thus these disturbances can also be detected by means of a detecting device according to the invention.

In the case of railroads or other systems or stations where electrical energy is available it may, at times, be practically and economically suitable to utilize as heating means electrical elements or, optionally, electrical losses in the actual object. The snow detecting system of the present invention may, of course, also be utilized for connecting and disconnecting such heating means, although it is possible that an intermediate contact will be required. In this instance, snow and ice in the collecting means 40, 41 is melted either by direct heating through heating elements arranged therein or through heat conduction from the object.

In this latter instance, the snow detector need not be constructed with a special view to operational economy, since the power required to effect the electrical heating is many times greater than the power requirements of the detector. In contradistinction to this is the aforementioned situation where a gas or liquid burner is utilized, the electrical mean power consumption of which is of the order of 0.1–1 W, depending on the circumstances.

It should also be mentioned that the method and system of the present invention are not dependnt on the expedient of collecting a medium in a funnel-like device nor the arrangement whereby the level of the medium rises above a predetermined reference level at which some specific function, e.g. heating or ejection of the medium by air, is initiated. It will be obvious that any medium located between the wave transmitter and the wave receiver, e.g. in suspension in air therebetween will, by damping the wave, change the intensity of the wave received by the receiver and can therefore be used for initiating any desired function.

The invention is therefore not restricted to the described application, e.g. with point switches, but that many other applications are possible, such as the detection of smoke and fog for example, under the condition that disturbing waves from the surroundings are effectively eliminated. Neither is the invention restricted to the above described embodiments thereof, but can be combined and modified within the scope of the following claims.

I claim:

1. A system for detecting the presence on an object of media harmful to the efficient operation of the object, comprising a chute-like measuring device located near said object and having arranged therein a box-shaped space for receiving the media to be detected, said space comprising an upwardly and outwardly tapering portion, a bottom portion and a tube located beneath said bottom portion and communicating therewith through a slot, the extension of the slot in the longitudinal direction of the tube being shorter than the tube, and wave transmitting means arranged at one end of the tube and detector means responsive to waves transmitted by the wave transmitting means arranged at the opposite end of the tube, the detector means being adapted to transmit a signal to actuator means cooperating with the object served by the system to remove the harmful media from the object, said signal being dependent on the degree of damping to which the wave from the transmitter means is subjected by the media present in the media receiving space.

2. A system according to claim 1, wherein said actuator is arranged to control a heating device operating to remove snow and ice from the object.

3. A system according to claim 1, wherein said actuator is arranged to control a compressed air device operating to blow away foreign material from the object.

4. A system according to claim 2, wherein means are provided to automatically and cyclically connect and disconnect the detector means in such a manner that it is disconnected during the time when the heating device is operating.

5. A system according to claim 3, wherein means are provided to automatically and cyclically connect and disconnect the detector means in such a manner that it is disconnected during the time when the compressed air device is operating.

6. A system according to claim 4, wherein the measuring device is thermically connected to the object through the thermal conductor in order to melt snow and ice from said device when the heating device is operating for removal of snow and ice from the object, said media receiving space being provided with drainage holes.

7. A system according to claim 5, wherein the compressed air device is arranged to blow away foreign material from said measuring device at the same time as it is blowing away such material from the object, the measuring device having a closeable discharge opening capable of being opened by the pressure of the compressed air.

* * * * *